(12) United States Patent
Niederlander

(10) Patent No.: US 12,428,822 B2
(45) Date of Patent: Sep. 30, 2025

(54) SYSTEMS AND METHODS FOR A FLUID DIVERTER SYSTEM

(71) Applicant: Kohler Co., Kohler, WI (US)

(72) Inventor: Gabriel Maclean Niederlander, Wauwatosa, WI (US)

(73) Assignee: Kohler Co., Kohler, WI (US)

( * ) Notice: Subject to any disclaimer, the term of this patent is extended or adjusted under 35 U.S.C. 154(b) by 78 days.

(21) Appl. No.: 18/481,868

(22) Filed: Oct. 5, 2023

(65) Prior Publication Data
US 2024/0117614 A1     Apr. 11, 2024

Related U.S. Application Data

(60) Provisional application No. 63/378,619, filed on Oct. 6, 2022.

(51) Int. Cl.
*E03C 1/04*     (2006.01)
*B05B 1/12*     (2006.01)
*F16K 11/087*   (2006.01)

(52) U.S. Cl.
CPC .......... *E03C 1/0405* (2013.01); *F16K 11/087* (2013.01); *B05B 1/12* (2013.01)

(58) Field of Classification Search
CPC ......... E03C 1/0405; F16K 11/087; B05B 1/12
See application file for complete search history.

(56) References Cited

U.S. PATENT DOCUMENTS

| | | | |
|---|---|---|---|
| 1,661,431 A * | 3/1928 | Leibing | B67D 1/0083 251/315.1 |
| 2,043,714 A * | 6/1936 | Schellin | B05B 1/1636 239/447 |
| 3,056,418 A * | 10/1962 | Adams | F16K 11/087 251/315.1 |
| 3,182,336 A | 5/1965 | Greuter | |
| 3,341,132 A | 9/1967 | Parkison | |
| 4,629,121 A | 12/1986 | Hengesbach | |
| 5,944,055 A * | 8/1999 | Dicky | F16K 11/0873 251/148 |
| 6,634,380 B2 | 10/2003 | Bartkus et al. | |
| 7,137,410 B2 | 11/2006 | Rosko | |
| 7,188,786 B2 | 3/2007 | Dodd | |
| 7,337,804 B2 | 3/2008 | Rosko | |

(Continued)

FOREIGN PATENT DOCUMENTS

DE     102016210063 B3 *  8/2017 .......... B05B 1/1645

*Primary Examiner* — Patrick C Williams
(74) *Attorney, Agent, or Firm* — Husch Blackwell LLP

(57) ABSTRACT

An improved fluid diverter mechanisms in fluid control valves for use within faucets, such as kitchen faucets. The fluid diverter mechanisms are aligned in a triangular formation and include a hollow, rotatable sphere with an extended shaft to allow for improved operation of a faucet. The hollow, rotatable sphere includes an entry hole and an exit hole to allow for fluid flow regulation. The hollow, rotatable sphere also includes an anti-rotation feature. The fluid diverter mechanism includes at least two set points, signifying multiple different spray types/functions, to which the mechanism diverts a fluid. In operation, the extended shaft of the hollow, rotatable sphere may be moved to a desired set point, rotating the sphere, which in turn aligns its exit hole with a respective spray delivery line associated with the selected desired set point.

14 Claims, 6 Drawing Sheets

(56) References Cited

U.S. PATENT DOCUMENTS

| | | |
|---|---|---|
| 7,717,131 B2 | 5/2010 | Creswell et al. |
| 7,753,074 B2 | 7/2010 | Rosko et al. |
| 7,854,401 B2 | 12/2010 | Malek |
| 7,980,268 B2 | 7/2011 | Rosko et al. |
| 8,056,578 B2 | 11/2011 | Lopp et al. |
| 8,517,055 B2 | 8/2013 | Lopp et al. |
| 8,671,984 B2 | 3/2014 | Rosko et al. |
| 8,733,674 B2 | 5/2014 | Kajuch |
| 8,758,966 B2 | 6/2014 | Cho et al. |
| 8,800,893 B2 | 8/2014 | Malek et al. |
| 10,562,046 B2 | 2/2020 | Jenkins et al. |
| 10,582,830 B2 | 3/2020 | Fasson et al. |
| 2008/0110502 A1* | 5/2008 | Oh .............................. E03C 1/04 |
| | | 137/119.05 |
| 2016/0074884 A1 | 3/2016 | Short |
| 2021/0148101 A1* | 5/2021 | Lev ....................... F16K 31/605 |
| 2021/0316338 A1 | 10/2021 | Kavchok et al. |
| 2022/0161280 A1* | 5/2022 | Lo ............................. B05B 1/02 |

\* cited by examiner

SYSTEMS AND METHODS FOR A FLUID DIVERTER SYSTEM

CROSS-REFERENCE TO RELATED APPLICATIONS

The present disclosure claims the benefit of U.S. Provisional Application No. 63/378,619, filed Oct. 6, 2022. The complete disclosure of which is hereby incorporated by reference.

TECHNICAL FIELD

The present disclosure relates generally to fluid control valves and, more particularly, to fluid diverter valves for use within faucets, such as kitchen faucets.

BACKGROUND

It is often desirable to provide a faucet with more than one type of fluid spray or flow function. However, conventional faucets and their associated spray heads typically only offer two modes, e.g., a shower mode and a stream mode, generally switched between the two by means of a pressable and/or slidable button. In shower mode, fluid (typically, water) is discharged in a relatively wide spray pattern comprising a large number of small, individual streams.

In stream mode, fluid is discharged in a single, relatively narrow, concentrated stream. While stream mode may be adequate for most daily use, due to restrictions in flow rate when in stream mode, flow coming out of the faucet typically becomes much more gentle and soft than when in shower mode. As such, faucet spray may not clean as efficiently. Moreover, as flow rates become increasingly slower (for example, due to various water saving mechanisms, code requirements, etc), a typical faucet may take a longer amount of time to fill sinks, pots, pans, etc which leads to users wasting more time waiting near the faucet, holding heavy pots during the filling process, and more. This results, at least in part, in inefficient and less effective cleaning. Wider spray patterns associated with shower mode, while not identical, share similar inefficiencies. While multiple individual streams associated with shower mode provide increased pressure, which assists with cleaning and removing residual matter (such as food, stains, etc.), the wide spray pattern may be undesirable as it can cause substantial spray splash-back, which typically causes water to spray onto unintended areas. This forces the faucet user to spend even more time cleaning. Consequently, alternative and/or additional spray delivery modes may be useful.

While various attempts have been made in the area of bathroom faucets to incorporate different flow patterns for human washing, faucets focused on filling sinks and washing of pots, pans, etc. have not received similar focus. To the extent attempts have been made to increase functionality of kitchen faucets, they often involve complex designs and can be difficult to operate in use. They also do not all provide advantageous flow patterns. Further, they often lack increased functionality needed to improve function of the kitchen faucet at slower flow rates in order to improve cleaning.

Accordingly, there is a need to continue to improve functionality and features of faucets, particularly kitchen faucets, to render them more useful and user-friendly to consumers.

SUMMARY OF THE DISCLOSURE

The disclosure relates to an improved fluid diverter mechanism, also referred to herein as a fluid delivery type mechanism. Various embodiments disclosed herein utilize improved delivery type mechanisms of the disclosure in fluid control valves and, more particularly, in fluid diverter valves for use within faucets, such as kitchen faucets.

In one embodiment, fluid diverter mechanisms of the disclosure are aligned in a triangular formation and comprise a hollow, rotatable sphere with an extended shaft to allow for improved operation of a faucet. In a further embodiment, a fluid diverter mechanism of the disclosure is aligned along a paralleled axis.

In an exemplary embodiment, the hollow, rotatable sphere includes an entry hole and an exit hole to allow for fluid flow regulation. The hollow, rotatable sphere also includes an anti-rotation feature according to a further embodiment.

The fluid diverter mechanism may comprise at least two set points, signifying multiple different spray types/functions, to which the mechanism diverts a fluid. In operation, the extended shaft of the hollow, rotatable sphere may be moved to a desired set point, rotating the sphere, which in turn aligns its exit hole with a respective spray delivery line associated with the selected desired set point. In one non-limiting example, the fluid diverter mechanism comprises at least three set points.

The above summary is not intended to describe each illustrated embodiment or every implementation of the subject matter hereof. The figures and detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

DETAILED DESCRIPTION OF THE DISCLOSURE

Figure 1A:
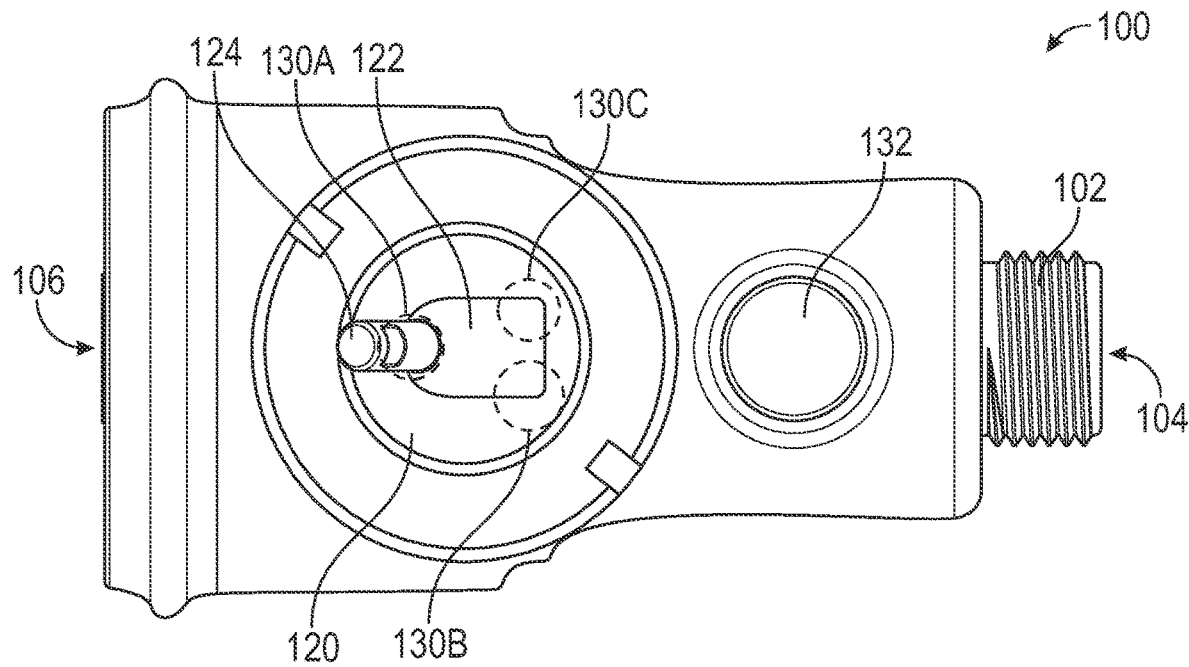
FIG. 1A illustrates a side view of internal components of one embodiment of a faucet assembly with a fluid diverter system of the disclosure.

FIG. 1A depicts a side view of internal components of an exemplary faucet assembly 100 with a fluid diverter system of the disclosure. The faucet assembly 100 includes an attachable unit 102, which may be implemented with remaining components of a faucet/valve system as readily understood by one of ordinary skill in the art but not depicted herein. The faucet assembly 100 is configured to accept an input flow 104 of a fluid (e.g., a liquid, typically water). The faucet assembly 100 may be incorporated with remaining faucet/valve components via the attachable unit 102 to facilitate fluid flow by any means of screwing/twisting, clips, bolts, adhesive, etc. as readily understood by those of ordinary skill in the art. Flow proceeds through the faucet assembly 100 from input flow 104 to output flow 106.

In the exemplary embodiment illustrated in FIG. 1A, the faucet assembly 100 includes a delivery type mechanism 120 comprising a hollow, rotatable sphere 122 with an extended shaft 124 to facilitate various types of fluid spray and flow functions. With additional reference to FIG. 1B, the hollow, rotatable sphere 122 includes two holes, an entry hole (not shown) and an exit hole 126 to facilitate fluid entering and exiting the faucet assembly 100.

Referring back to FIG. 1A, the delivery type mechanism 120 includes at least three set points 130A, 130B, and 130C. In exemplary embodiments, set points 130A, 130B, and 130C represent the implementation of at least three different types of fluid spray and/or flow functions (for example, shower, stream, mist, spray, flat, jet, etc.) for selection by a user. The hollow, rotatable sphere 122 and extended shaft 124 may be interchangeably moved/positioned between set points 130A, 130B, 130B. Each set point 130A, 130B, 130C facilitates diversion of fluid to associated delivery lines (alternatives of which are described in more detail below with respect to FIG. 2C), which implements different types of fluid spray and/or flow function output for various uses/functions of the faucet assembly 100. The delivery type mechanism 120, particularly the rotatable shaft 122, may comprise anti-rotational features, and an anti-rotational pin which keep the delivery type mechanism 120 fixed in position at the desired set point 130A, 130B, 130C.

In an alternative embodiment not shown, the delivery type mechanism includes at least two points, such as in a linear arrangement, for use as an off/on valve in addition to a spray diverter.

When in operation, the delivery type mechanism 120 (particularly, the hollow, rotatable sphere 122 and extended shaft 124) of the exemplary faucet assembly of FIG. 1A may be positioned to the desired set point 130A, 130B, 130C within a triangular formation (as depicted in FIG. 1A). In this position, the exit hole 126 aligns with its respective delivery line (140A for example), which generates a certain spray type or flow function, as previously described.

Figure 1B:
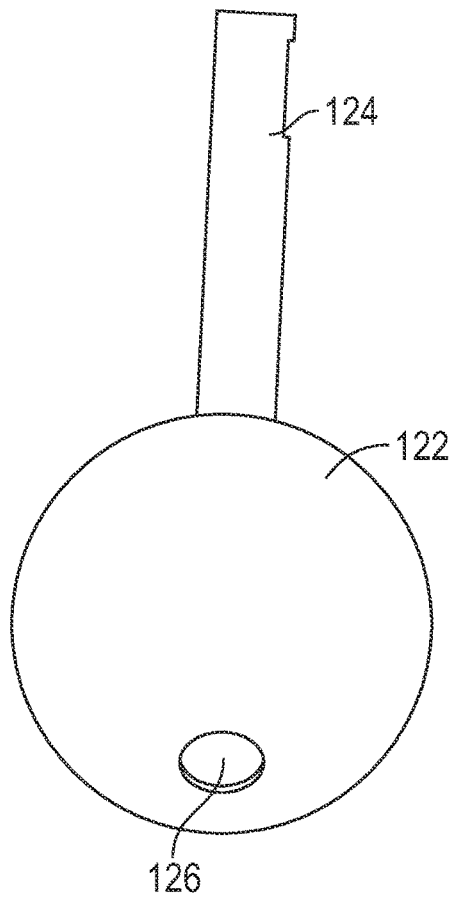
FIG. 1B illustrates a side view of a rotatable sphere and extended shaft of the fluid diverter system of FIG. 1A.
Figure 1C:
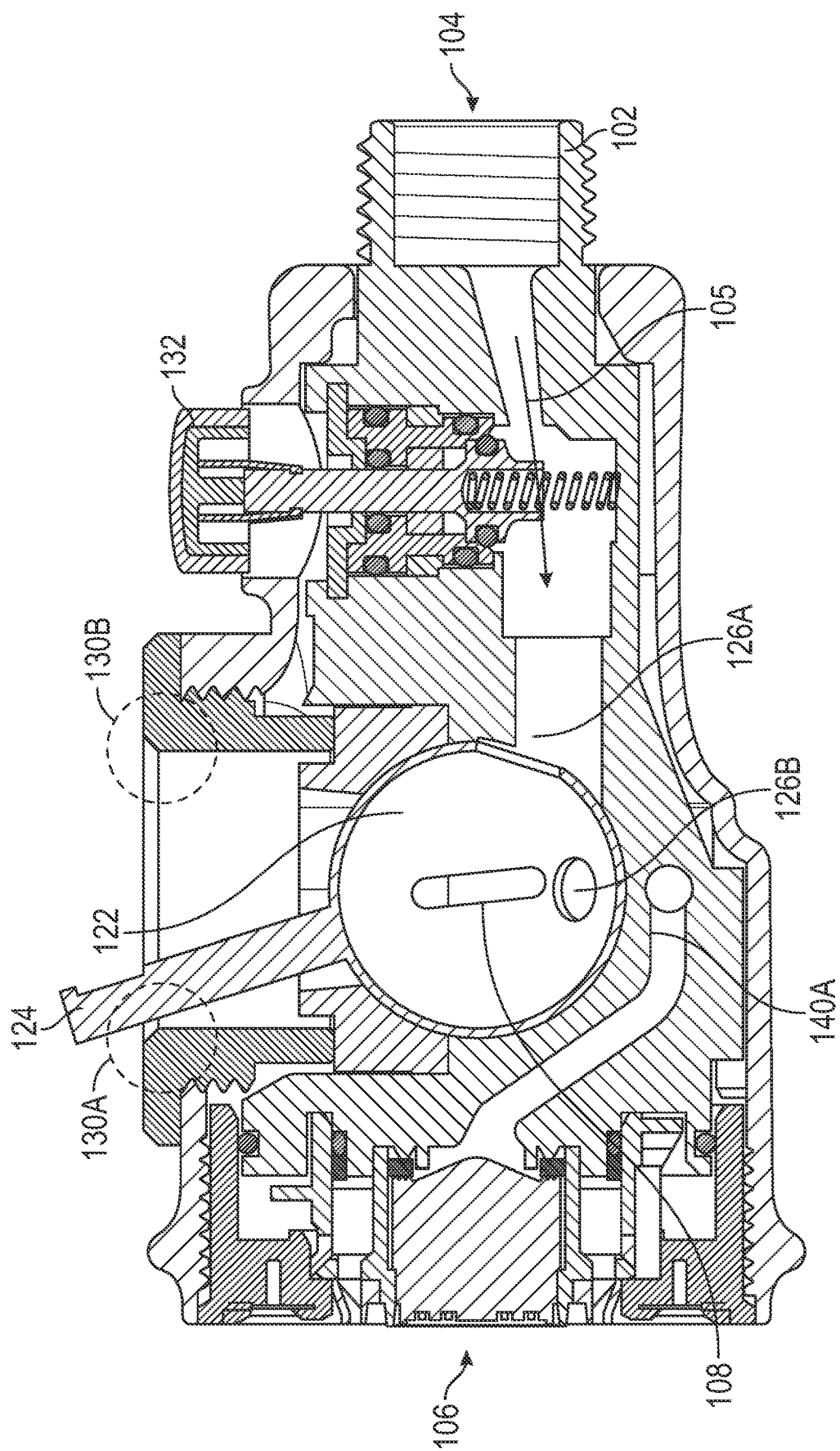
FIG. 1C illustrates a cross-sectional view of the faucet assembly of FIG. 1A.

FIG. 1C illustrates a cross-sectional view of the faucet assembly of FIG. 1A. The faucet assembly 100 includes an attachable unit 102, as previously described, to accept the input flow 104 of fluid. The input flow 104 proceeds through the faucet assembly 100, via flow path 105, and exits the faucet assembly 100 as output flow 106. The faucet assembly 100 also includes a slot 108 for receiving an anti-rotational pin. The hollow, rotatable sphere 122 includes entry hole 125, allowing fluid to enter the faucet assembly 100 as input flow 104 and along flow path 105 therethrough. The hollow, rotatable sphere 122 also includes exit hole 126, which enables the fluid to flow from the hollow, rotatable sphere 122 and out of the faucet assembly 100 as output flow 106. For example, as currently depicted in FIG. 1C, the delivery type mechanism 120 (more particularly the hollow, rotatable sphere 122 and extended shaft 124) is positioned at set point 130A, wherein the exit hole 126 aligns with its respective delivery line 140A to generate a desired fluid spray and/or flow function associated with the output flow 106 as described herein. The extended shaft 124 of the delivery type mechanism 120 may be repositioned diagonally to an alternative set point 130A, 130B, such as set point 130B, which repositioning rotates the hollow, rotatable sphere 122 to align the exit hole 126 with set point 130B's respective delivery line (not shown) to generate an alternative one of multiple types of fluid spray and/or flow function associated with set point 130B.

The faucet assembly 100 can optionally a power or boost function, in which a boost diverter with boost button assembly 132 allows for an increased influx of water through flow path 105 upon activation (e.g. pressing) of the boost diverter with boost button assembly 132.

Figure 2A:
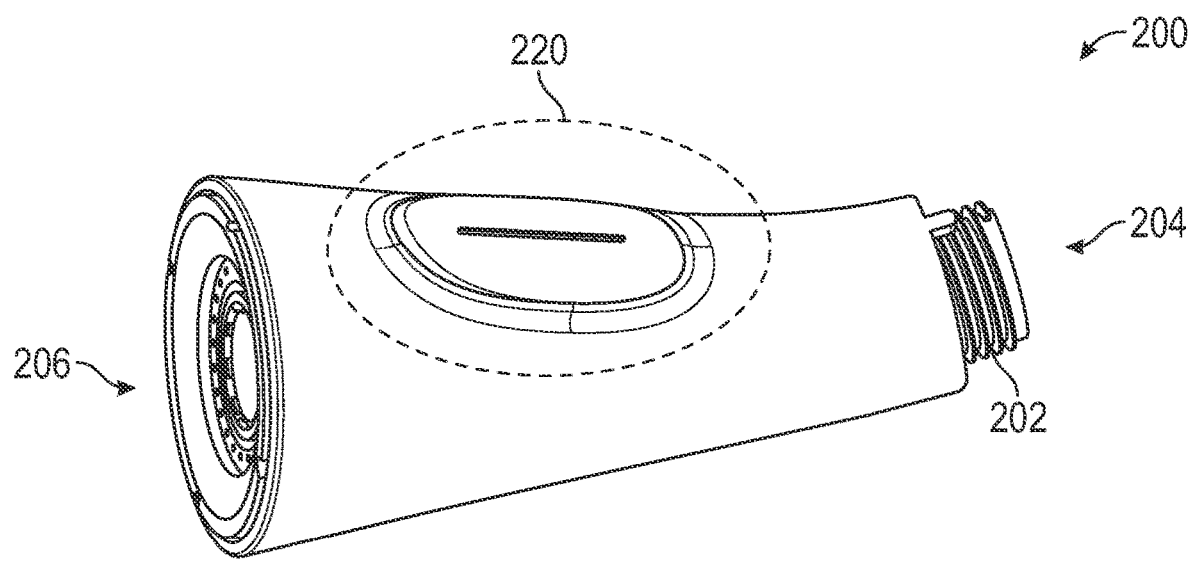
FIG. 2A illustrates a schematic view of a faucet assembly with an alternate embodiment of a fluid diverter system of the disclosure.
Figure 2B:
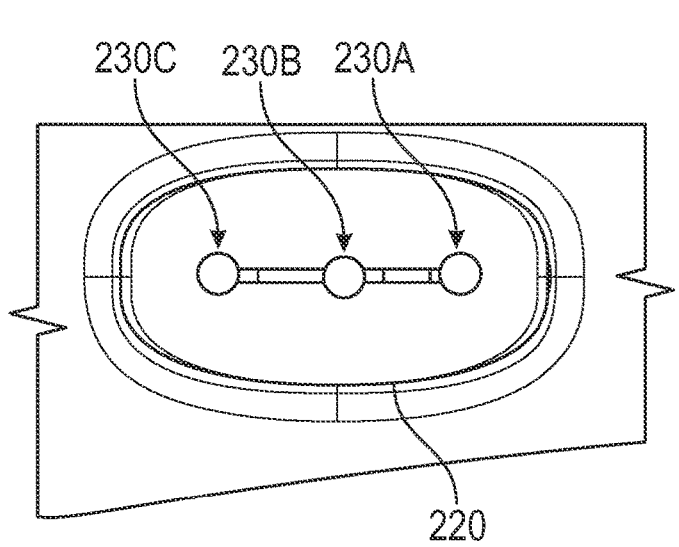
FIG. 2B illustrates a detailed, plan view of the fluid diverter system of the faucet assembly of FIG. 2A.
Figure 2C:
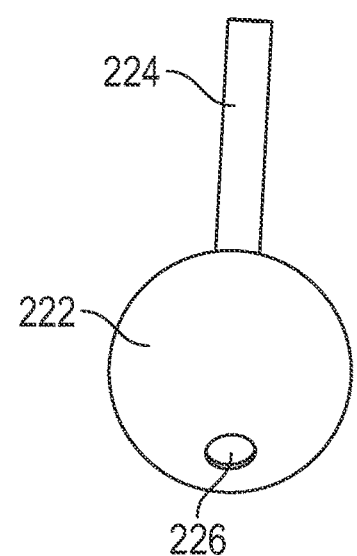
FIG. 2C illustrates a side view of a rotatable sphere and extended shaft of the fluid diverter system of FIG. 2A.

FIG. 2A illustrates a schematic view of a faucet assembly 200 with an alternate embodiment of a fluid diverter system of the disclosure. The faucet assembly 200 may be incorporated with remaining faucet/valve components via the attachable unit 202 as described above with respect to FIG. 1A. The faucet assembly 200 is configured to accept an input flow 204 of fluid (e.g., a liquid, typically water). Flow proceeds through the faucet assembly 200 from input flow 204 to output flow 206.

As illustrated in FIGS. 2A-2D, the faucet assembly 200 includes a delivery type mechanism 220 comprising a hollow, rotatable sphere 222 with an extended shaft 124 to facilitate various fluid spray and/or flow operations as described herein. The hollow, rotatable sphere 222 includes two holes, an entry hole 225 and an exit hole 226 to facilitate the fluid entering and exiting the faucet assembly 200.

The delivery type mechanism 220 in the faucet assembly 200 includes at least three set points 230A, 230B, 230C. In exemplary embodiments, set points 230A, 230B, 230C represent the implementation of at least three different types of fluid spray and/or flow functions (for example, shower, stream, mist, spray, flat, jet, etc.) for selection by a user. The hollow, rotatable sphere 222 and extended shaft 224 may be interchangeably moved/positioned between set points 230A, 230B, and 230C. Each set point facilitates diversion of fluid to associated delivery lines (described in more detail in conjunction with FIG. 2D), which implements different types of fluid spray and/or flow function output for various uses/functions of the faucet assembly 200. The delivery type mechanism 220, particularly the rotatable shaft 222, may comprise anti-rotational features (not shown), which keeps the delivery type mechanism 220 fixed in position at the desired set point 230A, 230B, 230C.

Figure 2D:
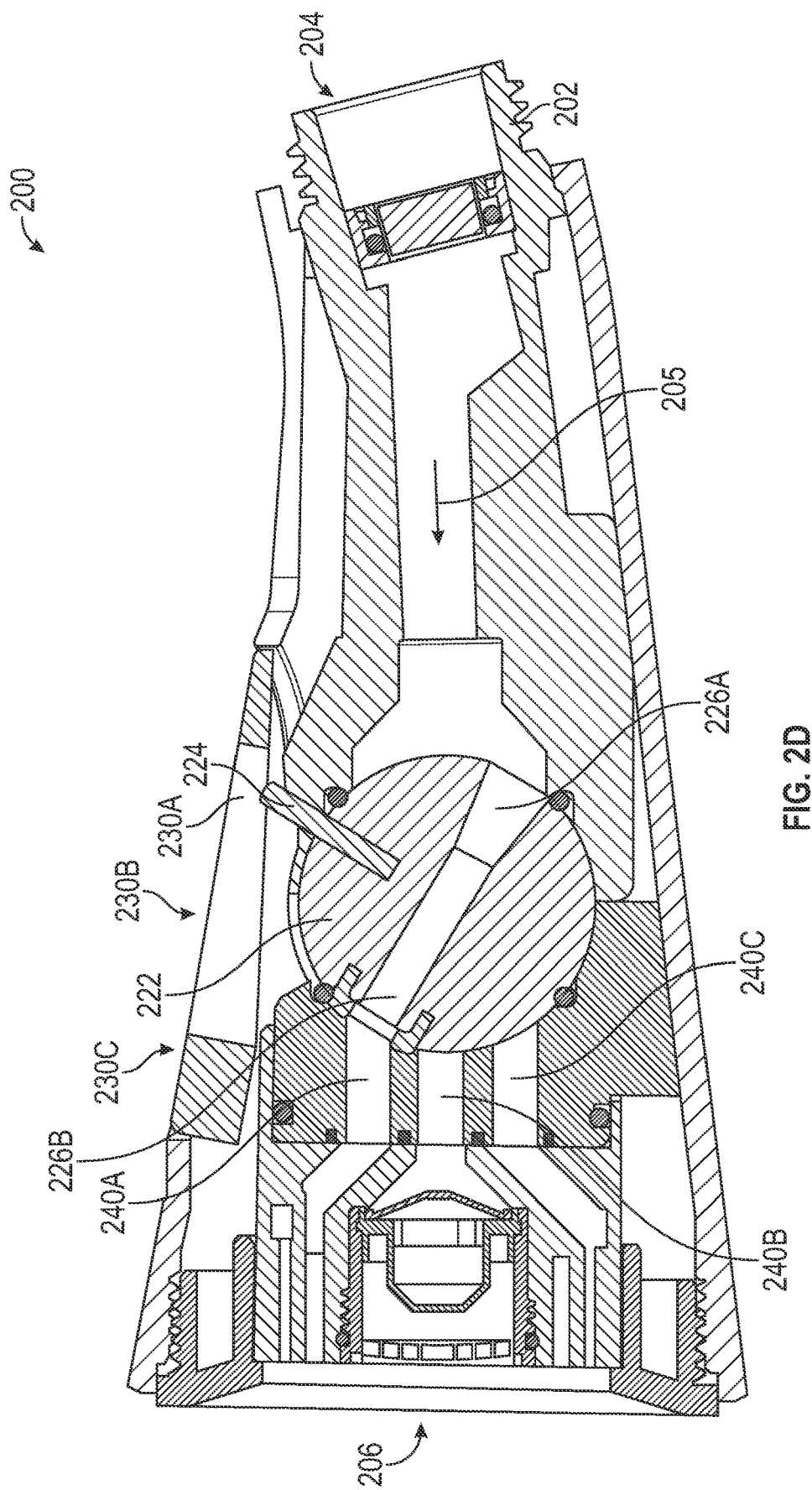
FIG. 2D illustrates a cross-sectional, side view of the faucet assembly of FIG. 2A.

When in operation, as compared to the embodiment described and illustrated in conjunction with FIGS. 1A-1C, the delivery type mechanism 220 (particularly, the hollow, rotatable sphere 222 and extended shaft 224) of the faucet assembly of FIG. 2A may be repositioned to the desired set point 230A, 230B, 230C along a paralleled axis (as depicted in FIGS. 2A and 2D). In each such position, the exit hole 226 aligns with its respective delivery line, which generates a certain spray type or flow function, as previously described.

According to one aspect of this embodiment, as depicted in FIG. 2D, the delivery type mechanism 220 of FIG. 2A (particularly, the hollow, rotatable sphere 222 and extended shaft 224) is positioned to set point 230A, wherein the exit hole 226 aligns with its respective delivery line 240A to generate a desired fluid spray and/or flow function associated with the output flow 206 as described herein. The extended shaft 224 of the delivery type mechanism 220 may be repositioned, along the paralleled axis thereof, to an alternative set point 230B, 230C, such as set point 230B. Such repositioning rotates the hollow, rotatable sphere 222 to align the exit hole 226 with set point 230B's respective delivery line 240B in order to generate an alternative one of multiple types of fluid spray and/or flow function associated with set point 230B.

The delivery type mechanism 220 may then be repositioned, along the paralleled axis thereof, to an alternative set point 230A, 230C, such as set point 230C. Such repositioning rotates the hollow, rotatable sphere 222 to align the exit hole 226 of hollow, rotatable sphere 222 with respective delivery line 240C of set point 230C to generate yet another alternative one of multiple types of fluid spray and/or flow function associated with set point 230C. Each set point 230A, 230B, 230C is associated with aa distinct delivery line 240A, 240B, 240C, respectively, to generate a distinct type of fluid spray and/or flow function exiting the faucet assembly 200 as the output flow 206.

Referring FIGS. 3A-3D, the faucet assembly 300 can optionally include a multiple function spray head, such as a three function spray head, with a power or boost function, in which a boost diverter with boost button assembly 302 allows for an increased in flux of water through faucet inlet 304 to outlet 306 upon activation (e.g. pressing) of the boost diverter with boost button assembly 302.

Figure 3A:
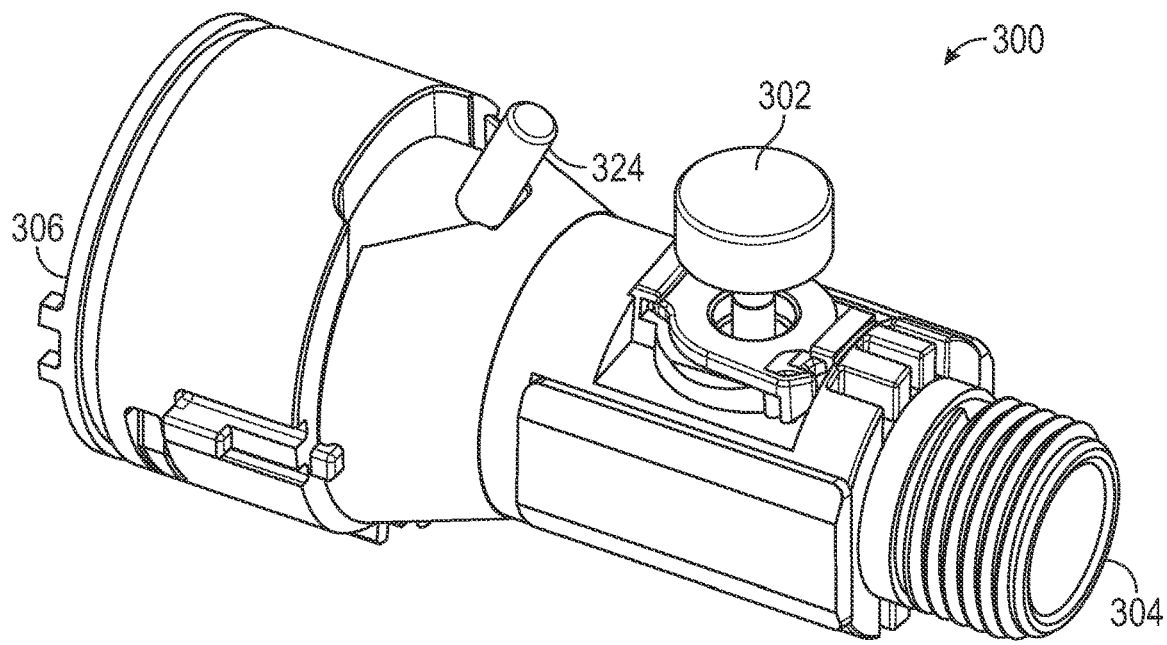
FIG. 3A illustrates a perspective view of the fluid diverter system of the faucet assembly.
Figure 3B:
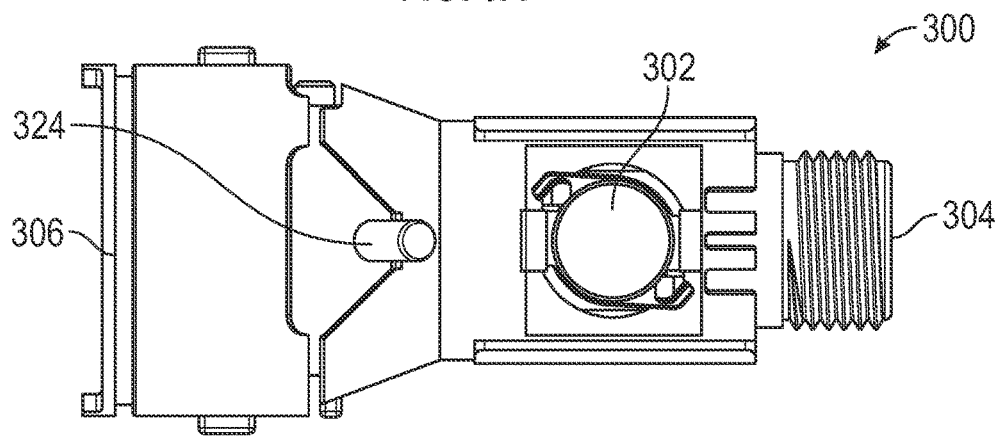
FIG. 3B illustrates a top view of the fluid diverter system of the faucet assembly.
Figure 3C:
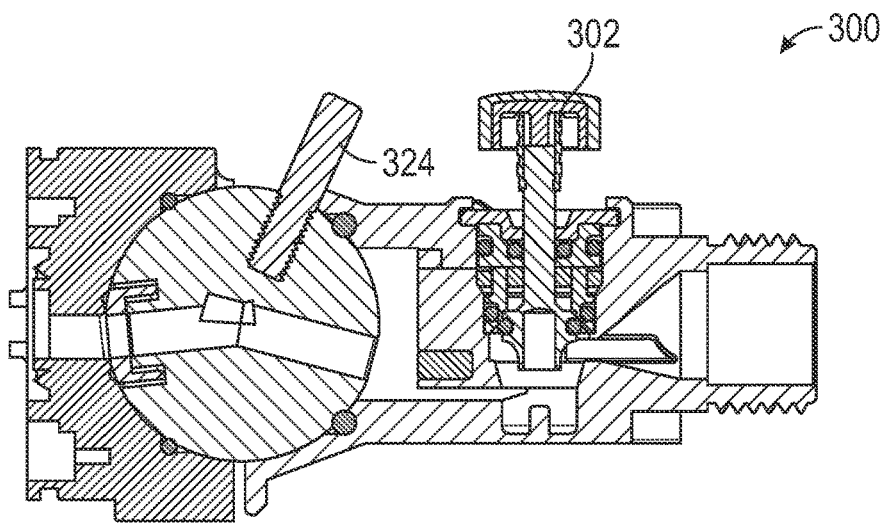
FIG. 3C illustrates a side view of internal components of one embodiment of the faucet assembly with the fluid diverter system of the disclosure.
Figure 3D:
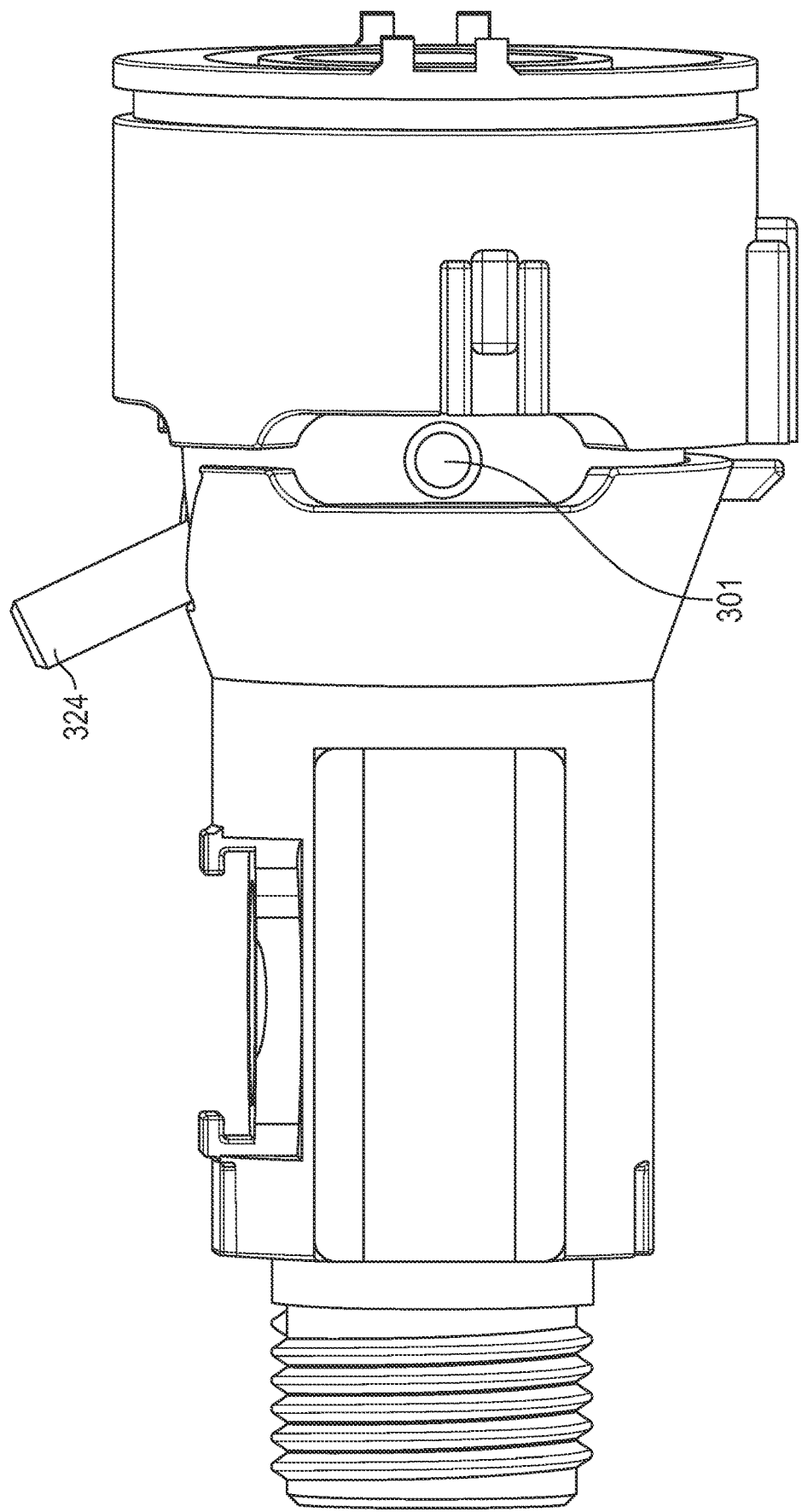
FIG. 3D illustrates another perspective view of the fluid diverter system of the faucet assembly.

As best illustrated in FIG. 3D, the faucet assembly 300 may also include several anti-rotational features, including an anti-rotational pin 301 as seen in FIG. 3D. The anti-rotational pin 301 may be inserted into the slot 308 for receiving the anti-rotational pin 301. The anti-rotational pin 301 is situated horizontally and prevents rotation of the fluid diverter system around an axis. The rotational function of the fluid diverter system is limited when the anti-rotational pin 301 is inserted into the slot 108 (slot 108 shown in FIG. 1C). Further, when anti-rotational pin 301 is inserted into the slot 108, the extended shaft 324 cannot rotate around the entire circumference of the fluid diverter system.

When using fluid diverter systems of the disclosure, fluid spray/flow function of the faucet construction is consolidated into a single mechanism—i.e., the delivery type mechanism. As such, multiple buttons/switches are not required for a user to change fluid spray and/or flow function of a kitchen faucet as is the case with many conventional kitchen faucets. This frees up space on the exterior of the faucet, which can enhance aesthetics of the overall faucet system and more efficiently enable incorporation of additional features into the faucet system. Examples of additional features include those for shutting off/turning on output flow from a faucet assembly and those for mixing fluid from two different input flows (e.g., hot and cold water sources).

Fluid diverter systems of the disclosure are particularly useful in kitchen faucets, although their use is not limited to kitchen faucets. Faucets in lavatories, showers, or any other environment, including a garden hose, may also benefit from this disclosure.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

What is claimed is:

1. A delivery mechanism for directing a flow of fluid through a faucet, comprising:
   a rotatable sphere configured to receive and direct a flow of fluid into one of a plurality of delivery lines coupled to the faucet, the rotatable sphere comprising an inlet for receiving the flow of fluid and an outlet configured to direct the flow of fluid into one of the plurality of delivery lines; and
   a shaft, coupled to the rotatable sphere, configured to move between a plurality of different positions, wherein each position aligns the outlet of the rotatable sphere with a different delivery line,
   wherein each one of the plurality of delivery lines corresponds to a different type of spray of the faucet, and
   wherein the plurality of different positions comprises three different positions arranged in a triangular formation with the shaft being movable between each of the three different positions.

2. The delivery mechanism of claim 1, wherein different types of spray comprise at least two types of sprays selected from a stream mode, a shower mode, a mist mode, a spray mode, a flat mode, or a jet mode of the faucet.

3. A faucet system for directing a flow of fluid through a faucet, comprising:
   an attachable unit for receiving an input flow of fluid;
   a delivery mechanism, coupled to the attachable unit, configured to receive and direct the input flow of fluid into one of a plurality of delivery lines of the faucet system, the delivery mechanism comprising:
     a rotatable sphere configured to receive and direct the input flow of fluid, the rotatable sphere comprising an inlet for receiving the input flow of fluid and an outlet for delivering the input flow into one of the plurality of delivery lines; and
     a shaft coupled to a rotatable sphere configured to move between a plurality of positions, wherein each position aligns the outlet of the rotatable sphere with a different delivery line; and
   a power function configured to receive a user input, and, upon receiving the user input, increase an influx of the input flow of fluid into the delivery mechanism.

4. The faucet system of claim 3, further comprising:
   a slot configured to receive an anti-rotational pin for securing the rotatable sphere within the faucet system.

5. The faucet system of claim 3, wherein the power function comprises a button assembly coupled to the faucet system.

6. The faucet system of claim 3, further comprising:
   anti-rotational features configured to maintain a position of the shaft at one of the plurality of different positions.

7. The faucet system of claim 3, wherein the shaft is configured to extend outside of a body of the faucet assembly and receive a user input to move between the plurality of positions.

8. The faucet system of claim 3, wherein the faucet comprises at least one of a kitchen faucet, a lavatory faucet, or a shower faucet.

9. The faucet system of claim 3, wherein the attachable unit is configured to couple to a faucet component through at least one of a threaded mechanism, adhesives, or fastening mechanism.

10. A faucet assembly for directing a flow of fluid through a faucet, comprising:
    a diverter housing coupled to an attachable unit configured to receive an input flow of fluid from a fluid source and an outlet configured to provide the flow of fluid to the faucet through a plurality of delivery lines;

a delivery mechanism coupled to the diverter housing configured to direct the flow of fluid from the fluid source into one of the plurality of delivery lines, the delivery mechanism comprising:

a rotatable sphere coupled to the diverter housing between the attachable unit and the outlet, the rotatable sphere comprising an inlet configured to receive the input flow of fluid from the attachable unit and a sphere outlet configured to provide the flow of fluid into the plurality of delivery lines; and a shaft coupled to the rotatable sphere configured to extend out of the diverter housing to receive a user input, wherein, upon receiving the user input, the shaft is configured to move between at least two positions causing the sphere outlet of the sphere to simultaneously align from a first delivery line to a second delivery line; and a boost diverter coupled to the diverter housing situated adjacent to the attachable unit, the boost diverter configured to receive a user input to increase an influx of fluid from the attachable unit to the rotatable sphere.

11. The faucet assembly of claim 10, wherein the rotatable sphere comprises a hollow body connecting the inlet and the sphere outlet.

12. The faucet assembly of claim 10, wherein the plurality of delivery lines are coupled to different nozzles corresponding to different sprayers.

13. The faucet assembly of claim 10, further comprising:

an anti-rotational pin configured to be horizontally situated within a slot coupled to the rotatable sphere to prevent rotation of the delivery mechanism around an axis.

14. The faucet assembly of claim 10, wherein the boost diverter comprises a boost button assembly coupled to a spring that is configured to compress upon receiving a user input.

* * * * *